Sept. 23, 1952     G. C. VANDERBERG     2,611,656
AXLE CONSTRUCTION
Filed April 26, 1946     2 SHEETS—SHEET 1
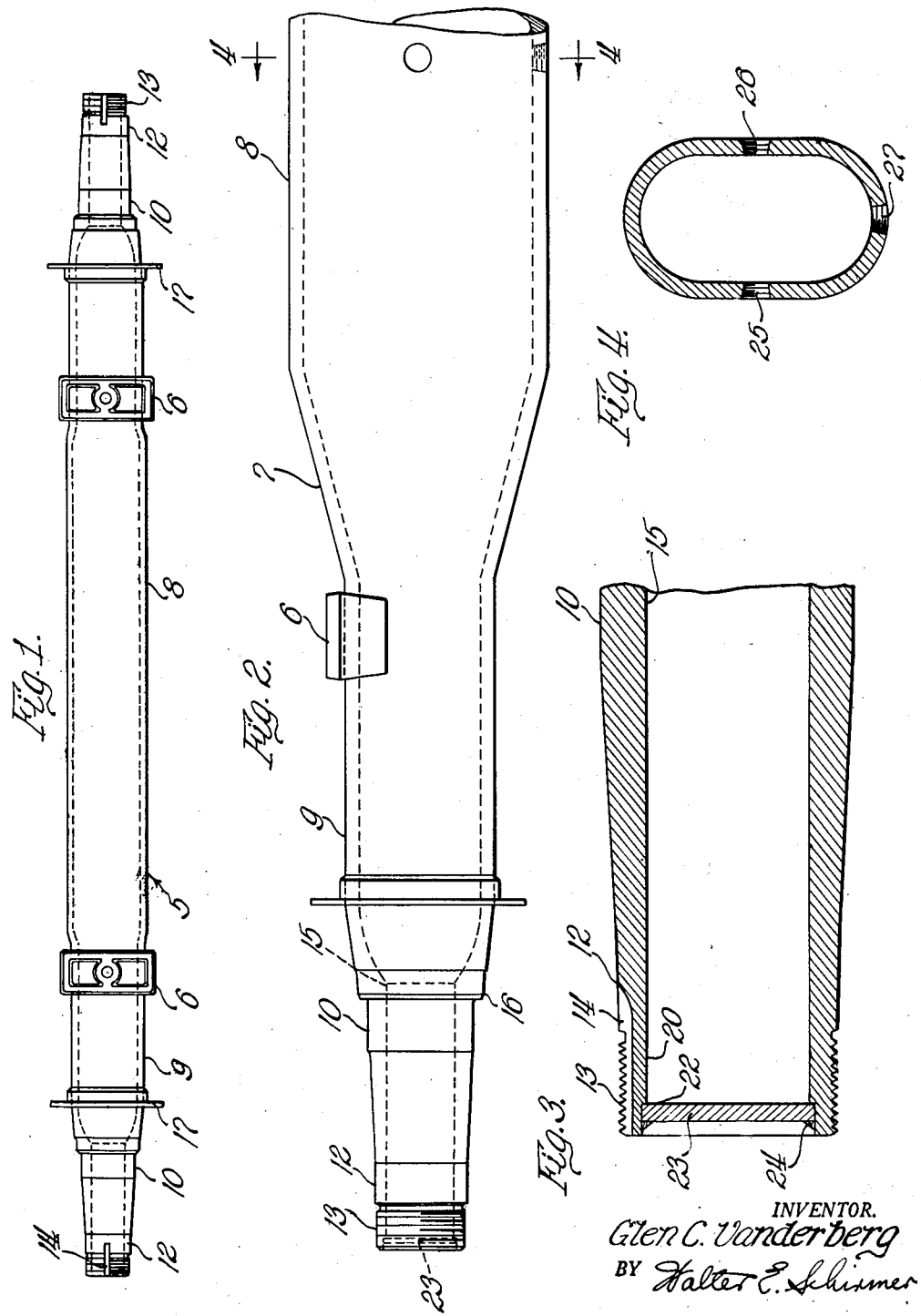
INVENTOR.
Glen C. Vanderberg
BY Walter E. Schirmer
ATTY.

Sept. 23, 1952  G. C. VANDERBERG  2,611,656
AXLE CONSTRUCTION

Filed April 26, 1946  2 SHEETS—SHEET 2

MOMENTS

STRESS LBS./SQ.IN.

DEFLECTION

INVENTOR.
Glen C. Vanderberg
BY Walter E. Schirmer
ATTY.

Patented Sept. 23, 1952

2,611,656

UNITED STATES PATENT OFFICE 2,611,656

AXLE CONSTRUCTION

Glen C. Vanderberg, Buchanan, Mich., assignor to Clark Equipment Company, Buchanan, Mich., a corporation of Michigan Application April 26, 1946, Serial No. 665,134

5 Claims. (Cl. 301—124)

This invention relates to axle constructions, and more particularly is directed to an axle structure for use on trailers of the type used for hauling goods and merchandise over the highways.

Primarily, the present invention is concerned with a dead trailer type axle constructed from tubing and so formed as to provide the maximum bending moment with the minimum amount of deflection under the severe loading to which such axles are subjected, while at the same time keeping the size of the material used in forming the axle to a minimum for the purpose of reducing weight and providing economy in the cost of the axle.

Trailer axles of this type heretofore constructed have usually been of a structural section, such as an I-beam section or the like, with forged ends either welded to or upset from the I-beam section and so machined as to provide the proper wheel bearing seats.

There has also been provided tubular trailer axles in which the extreme ends beyond the brake plates are forged down to provide a thickened reinforced section for the wheel bearing seats. However, in this latter type, the tubular member has been of uniform cross section and size between the spring pads, and has been relatively bulky due to the necessity of providing a sufficient section modulus to absorb the loading on such axles. This is undesirable from the standpoint of increasing the unsprung weight of the vehicle, as well as costly in that the amount of material employed is greater than is necessary by the present invention.

One of the primary objects of the present invention is to provide a tubular trailer axle in which the central portion is formed of elliptical shape, with its major axis in a vertical plane, thereby materially increasing the section modulus and still retaining a relatively thin wall section. The arm portions of this axle are swaged down slightly from the original diameter to provide for slightly increased thickness beneath the spring pads, and the end portions of the tubular member are upset both internally and externally to provide thickened reinforced ends for receiving the wheel bearings.

The entire structure thus produced is then subjected to a heat treatment to provide additional strength, whereby a thinner walled tube can be used originally than was heretofore possible with trailer axles of conventional tubular design.

One of the advantages of the present construction is the provision of a greatly increased section modulus in the central portion of the axle, thereby increasing the bending moment of this portion of the axle so that it is not necessary, as has heretofore been the case, to put any amount of camber in the axle so that upon loading, it will deflect to its proper alinement. In previous constructions it has been necessary to provide a reverse camber so that upon loading the deflection produced would bring the axle ends out into proper alinement. With the present construction, the increase in the section modulus, as well as the heat treating, provide a construction in which there is relatively little deflection, the amount of deflection provided as compared to a tubular axle of uniform cross section and of appreciably thicker material being greatly reduced.

Still another object of the present invention is to provide within the axle itself a chamber which can be used as a compressed air storage chamber, eliminating the necessity of carrying separate air storage tanks, such as is now common practice on trailers where air brakes are employed. By closing the ends of the axle arms and providing suitable pipe taps into the central portion, the internal volume of the axle can be employed for an air pressure reservoir without in any way affecting the operation of the axle in its load carrying capacity.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a top plan view of an axle construction according to the present invention;

Figure 2 is an enlarged elevational view of a portion of the axle shown in Figure 1;

Figure 3 is a detail sectional view of the arm structure at one end of the axle;

Figure 4 is a sectional view taken substantially on line 4—4 of Figure 2;

Figure 5:
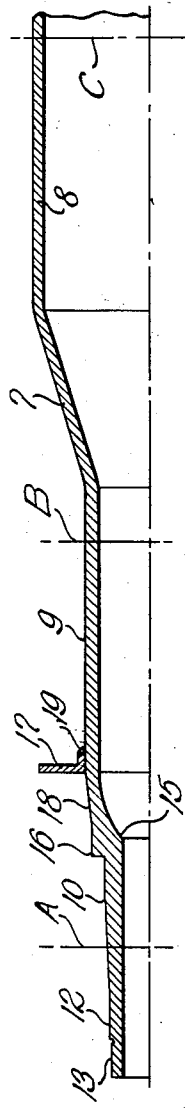
Figure 5 is a detail sectional view of one-half of the axle arm showing the variation in thickness in this arm.

Referring now in detail to the drawings, the axle housing indicated generally in Figure 1 is made from a carbon steel tube and, in the particular illustrated embodiment of the invention, the original diameter of this tube was approximately 7¾", with a wall thickness of 13/32".

The tube is initially subjected to swaging operations which reduce the diameter of the arms under the spring pads 6 to approximately 5⅛" diameter, thereby increasing the wall thickness of the tube from 13/32" to ½". The portion of the axle intermediate the spring pad 6 is subjected to a flattening operation either through rolls or in a die which flattens the normally circular tube into an oval or elliptically shaped tube having a transverse width of approximately 5⅜" and a vertical height of approximately 9 3/32". There is a smooth taper, indicated at 7, between the central oval shaped portion 8 and the spring pads 6 joining these two portions of the housing together, and the arm portions extending from the spring pads 6 out to the wheel seat portions are substantially cylindrical in form, as indicated at 9.

The extending ends of the axle beyond the cylindrical portions 9 are subjected to an upsetting and swaging operation which gathers metal internally of the tube ends, and also swages the external diameter down into the form shown in Figs. 1 and 2 to provide a cylindrical annular surface 10 for the inner wheel bearing seat and an outer annular surface 12 for the outer wheel bearing seat. The projecting end 13 of the axle arm is then threaded to receive a lock nut and thrust washer for holding the bearings in position, and is preferably provided with a suitable keyway 14 for locking the assembly in position. It will be noted that the internal thickening of the end of the axle arm is carried to the point indicated at 15, which is inwardly of the inner wheel bearing seat 10 in order to provide a thickened section at this point to prevent over-stressing of the metal at the junction of the inner wheel bearing seat and the radial shoulder portion 16.

Referring to Figure 5, the dot-dash line A indicates the center of the wheel load upon the axle arm, while the center line B indicates the location of the spring pad and the line C indicates the center of the entire axle. The axle is preferably provided with a pressed-on brake flange 17, which is located at the junction of the tapered portion 18 inwardly of the radial shoulder 16 of the cylindrical tubular portion 9. The brake flange 17 is welded, as indicated at 19, to the axle arm, and is preferably provided with circumferentially spaced openings by which the brake plate and the brake assembly may be supported thereon.

Figure 6:
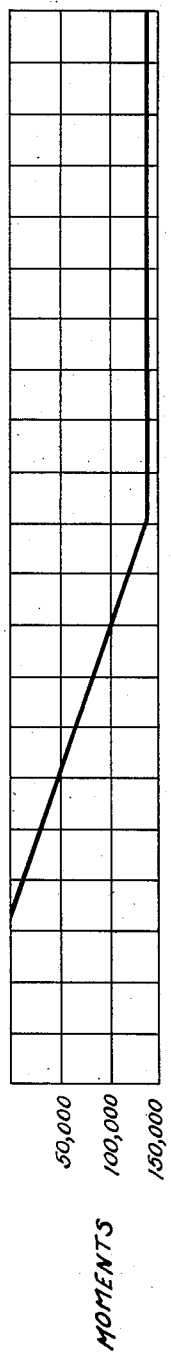
Figure 6 is a graphic illustration of the bending moment of the axle arm shown in Figure 5.
Figure 7:
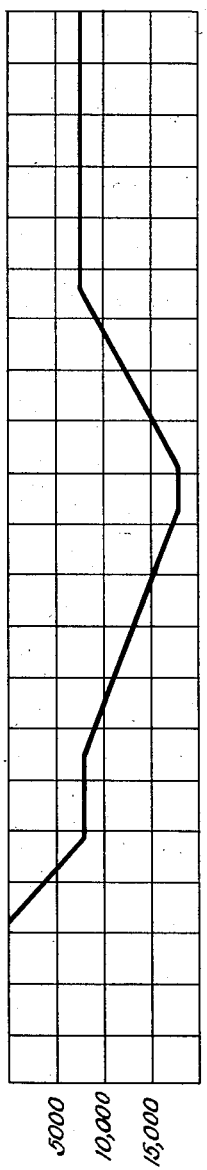
Figure 7 is a stress diagram of the axle arm shown in Figure 5.
Figure 8:
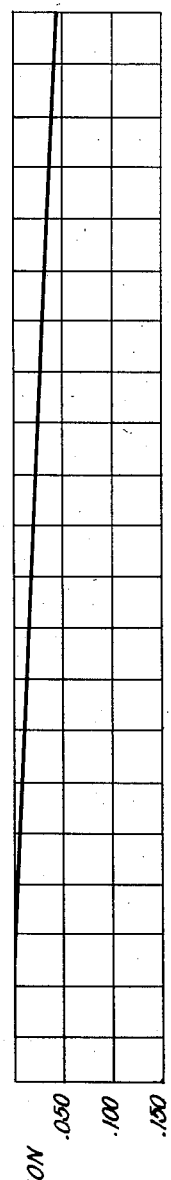
Figure 8 is a deflection diagram of the axle arm shown in Figure 5.

In Figures 6, 7 and 8 there are disclosed graphic charts illustrating respectively the bending moment, the stress and the deflection in an axle of the dimensions given which is subjected to a load of approximately 17,000 lbs., equally distributed along the line A intermediate the bearing seats of the axle. Thus, there is a loading of 8,500 lbs. upon the axle concentrated along the center line A. Using this as the point of application of the load, the bending moment through the progressive sections of the axle is indicated by the chart of Figure 6, and indicates that this bending moment is substantially zero at point A and increases to approximately 135,000 lbs. under the spring pads, the center of which is indicated at B. The bending moment from this point on remains substantially constant throughout the intermediate portion of the axle.

Figure 7 illustrates the stress loading in pounds per square inch on the axle of Figure 5 loaded as previously described. This graph illustrates that this stress increases to approximately 7500 lbs. per square inch at the inner bearing seat 10, remains constant up to the brake flange 17, and then increases from this point to the spring pad center line B, reaching a stress of 17,500 lbs. at this point. The stress then decreases through the tapered portion 7 of the housing to approximately 7,000 lbs. per square inch through the oval shaped center portion 8 of the axle. Considering deflection, the deflection of the axle shown in Figure 5 increases from zero at point A to a maximum of .040" at the center C of the axle.

In forging and upsetting the ends of the axle arms to provide the wheel bearing seats and the thickened reinforced portion of metal internally of the arms, attention is directed to U. S. Patent No. 1,978,685, issued October 30, 1934, to E. C. Mogford and George Spatta, which describes in detail the upsetting operations by which such metal is gathered and forged to form the sections of varying thickness.

After the axle has been thus upset and swaged to form a structure, such as shown in Figure 2, and the spring pads 6 and brake flanges 17 have been welded in position thereon, the axle housing is subjected to a heat treatment corresponding to that described in U. S. Patent No. 2,150,948, issued March 21, 1939, to George Spatta. The heat treatment of this housing consists of first heating the entire axle to a temperature of approximately 1525° F., then quenching the housing quickly and reheating or drawing the housing at a temperature of approximately 950° F. This removes all the stresses introduced into the axle by reason of the welding operations, and by applying the spring pads and brake flanges thereto, as well as any stresses which might have been introduced due to the swaging and forging operations. The housing as heat treated then has the characteristics shown in Figures 6, 7 and 8.

As will be noted in detail in Figure 3, the internal wall 20 of the housing adjacent its end is of uniform diameter, and is preferably so machined as to provide the radial shoulder 22 against which is seated a disc 23 which is welded into position and sealed by means of the annular weld 24. This provides an air-tight seal for the disc in the end of the axle arm, thereby closing off each end of the axle arm and forming within the housing an air-tight chamber. Preferably, at the center or adjacent the center of the axle, the elongated section 8, as shown in detail in Figure 4, is provided with tapped openings 25, 26 and 27. Suitable nipples are threaded into these openings for connecting the interior of the axle with an air compressor and with the air pressure lines leading to the brake mechanism, whereby the internal portion of the axle can act as a chamber or reservoir for storing air up under pressure to be used in the application of air brakes carried by the brake flanges 17.

I have found that with an axle of the structure disclosed utilizing a wheel tread of approximately 71 inches, the internal volume of the axle itself just slightly exceeds the volume of the conventional air pressure tanks carried by trailers of a size in which such an axle would be used. Consequently, such air reservoir tanks can be eliminated from these trailers and the axle of the present invention utilized for this function, as well as serving as an improved and strengthened axle structure having the desired characteristics of reduced deflection, as well as reduced stress.

I am aware that changes may be made in the dimensional relationships of the axle herein illustrated and described, and I therefore do not intend to be limited to the exact structural limitations which have been employed in describing an illustrated embodiment of the invention, but only insofar as the invention is defined by the scope and spirit of the appended claims.

I claim:

1. An axle formed from a tubular member of uniform wall thickness comprising a central portion of vertically arranged oval section and of substantially the original wall thickness, intermediate arm portions of circular section and of increased wall thickness, end portions of reduced diameter and having a wall thickness substantially greater than that of said intermediate portions, and frusto-conical connecting portions between said end portions and intermediate portions increasing in wall thickness from said intermediate portions to said end portions, said axle having progressive sections thereof from the center toward the ends thereof increasing in wall thickness to provide a substantially uniformly decreasing deflection rate from the center to the ends of said axle.

2. An axle of the trailing type having a central section of uniform wall thickness and elliptical cross section, intermediate arm portions of circular cross section smaller than the minor dimension of said elliptical portion and of increased wall thickness, frusto-conical portions at the outer ends of said arm portions progressively increasing in wall thickness and decreasing in cross section, and end portions of reduced cross section and substantially increased wall thickness.

3. The axle of claim 2 having means sealing the outer ends of said end portions to form a closed air chamber within said axle.

4. As an article of manufacture, an axle formed as an integral one-piece tubular member having a central enlarged elliptical section with its major axis disposed vertically, arm portions extending from opposite ends of said section of circular section and increased wall thickness, and wheel bearing portions at the ends of said arm portions of materially reduced circular section and substantially increased wall thickness, the end portions having seals therein to form said axle into a pressure-tight chamber.

5. As an article of manufacture, an axle formed as an integral one-piece tubular member having a central enlarged elliptical section with its major axis disposed vertically, arm portions extending from opposite ends of said section of circular section and having increased wall thickness, wheel bearing portions at the ends of said arm portions of materially reduced circular section and substantially increased wall thickness, the end portions having seals therein to form said axle into a pressure-tight chamber, and tapped openings into the central portion of said member for receiving pipe connections.

GLEN C. VANDERBERG.

REFERENCES CITED

The following references are of record in the file of this patent:

UNITED STATES PATENTS

| Number | Name | Date |
|---|---|---|
| 380,344 | Paterson | Apr. 3, 1888 |
| 1,686,562 | Jackson | Oct. 9, 1928 |
| 1,926,353 | Spatta | Sept. 12, 1933 |
| 1,939,558 | Loudy | Dec. 12, 1933 |
| 1,967,317 | Mogford et al. | July 24, 1934 |
| 2,025,343 | Oelkers et al. | Dec. 24, 1935 |
| 2,050,468 | Shipman | Aug. 11, 1936 |
| 2,124,406 | Spatta | July 19, 1938 |
| 2,132,725 | Davis | Oct. 11, 1938 |
| 2,133,091 | Gettig | Oct. 11, 1938 |
| 2,167,088 | Schirmer | July 25, 1939 |
| 2,227,436 | Buckwalter | Jan. 7, 1941 |
| 2,402,068 | Meador | June 11, 1946 |

FOREIGN PATENTS

| Number | Country | Date |
|---|---|---|
| 671,181 | France | Aug. 31, 1929 |